Patented June 23, 1931

1,811,516

UNITED STATES PATENT OFFICE

CARLTON EARLE MILLER, OF REDWOOD CITY, CALIFORNIA

HIGH TEMPERATURE HEAT INSULATION MATERIAL AND METHOD OF MAKING THE SAME

No Drawing.   Application filed April 7, 1924.   Serial No. 704,696.

The invention relates to heat insulation material adapted to be used for pipe covering, boiler settings, furnace and oven linings and the like.

An object of the invention is to provide an inexpensive heat insulation material having a high insulating efficiency.

Another object of the invention is to provide a heat insulating material made from a waste product.

A further object of the invention is to provide a process of making a heat insulating material from a waste product.

The invention possesses other advantageous features, some of which, with the foregoing, will be set forth at length in the following description, where I shall outline in full one method of making the material of my invention and one form of the finished product.

Heat insulating materials have heretofore been made from various mixtures of diatomaceous earth, basic magnesium carbonate and/or lime and asbestos. I have found that a relatively inexpensive and highly efficient heat insulating material may be made by using a large proportion of the relatively cheap and plentiful calcium carbonate in combination with basic magnesium carbonate.

The calcium carbonate, for use in the manufacture of this material, may be derived from any suitable source but I prefer to derive it from dolomite. The dolomite is first calcined in the usual manner to form dolomite lime and this is then comminuted by slaking or grinding, mixed with a suitable amount of water, and carbonated by passing carbon dioxide gas through or over the same, under certain well known conditions of temperature, concentration and time that require no description herein. In the present largely used method for the preparation of basic magnesium carbonate from dolomite, these conditions are so regulated that the magnesium mostly goes into solution as magnesium bicarbonate, so that the carbonating vessel contains a precipitated calcareous sludge and a supernatant magnesium bicarbonate solution. The calcareous sludge at present finds little use in the art and accumulates in enormous waste dumps, ponds and the like. This sludge is composed largely of calcium carbonate and contains varying percentages of magnesium carbonate, sand and other materials.

In accordance with my invention I propose to use this calcareous sludge, which at present is a waste product, in the manufacture of heat insulating material. In accordance with my invention, the carcareous sludge is mixed with a suitable quantity of basic magnesium carbonate, a suitable quantity of a porous, siliceous earth of organic origin, such as diatomaceous earth, infusorial earth, etc., a fiber binding agent such as asbestos, and water, and the mixture is formed into shape in moulds in accordance with the usual practice. These moulded shapes, pieces or blocks are then dried and sawed or milled to the shape and size required. The diatomaceous earth is in finely divided form and is intimately mixed with the calcareous sludge and the asbestos fiber.

The basic magnesium carbonate is preferably obtained by heating the magnesium bicarbonate solution to a temperature between 170 degrees and 212 degrees Fahrenheit, whereupon the magnesium is precipitated in the form of basic magnesium carbonate, which is very voluminous, having a relatively small weight per unit of volume. In order to control the percentage of basic magnesium carbonate in the finished product, the magnesium bicarbonate solution may be separated from the calcareous sludge and heated to cause precipitation of basic magnesium carbonate, which is then added to the calcareous sludge, to bring the calcareous sludge back to approximately the same calcium magnesium ratio as existed in the original dolomite.

It is not necessary, however, in carrying out the process, to separate the magnesium bicarbonate solution from calcium carbonate. Instead of filtering, decanting or otherwise removing the magnesium bicarbonate solution from the mixture, the total carbonated sludge or mixture may be heated to the required temperature to convert the magnesium bicarbonate to basic magnesium carbonate and the intimate mixture of the two alkaline earth carbonates, together with whatever additional matter may be present, compounded in the desired proportions I do not desire to limit myself to any particular proportions of the ingredients constituting the mixture, but I have made excellent heat insulating material of approximately the following composition:

| | |
|---|---|
| Calcium carbonate, basic magnesium carbonate mixture | 20 to 40% |
| Diatomaceous earth | 50 to 70% |
| Asbestos fiber | 10 to 15% |

I prefer to use this carbonated sludge in the heated condition and mix therewith the required proportions of diatomaceous earth and fibrous binding agent, such as asbestos fiber. The latter ingredients may, however, be added to the uncarbonated or carbonated sludge, prior to the decomposition of the magnesium bicarbonate, by heating, as above described.

The heat causes a precipitation of the magnesium in the form of the basic carbonate, as set forth above, which is very voluminous, causing a swelling or expansion of the material so that its weight per unit of volume is greatly reduced. When the magnesium bicarbonate is removed from the sludge prior to the addition of the diatomaceous earth, the process results in the formation of an excellent heat insulating material, which however is quite heavy. In several experiments employing different percentages of the ingredients, the weight of the finished dry blocks, 2″ x 6″ x 36″ vary from $6\frac{1}{10}$ lbs. to $7\frac{3}{10}$ lbs. When the magnesium bicarbonate is present in the mixture and is converted to the basic carbonate in the mixture, the finished product has the additional advantage of lightness. In one experiment employing 50% of diatomaceous earth, 40% carbonated dolomite and 10% asbestos, the finished dry block 2″ x 6″ x 36″ has an average weight of $2\frac{8}{10}$ lbs.

Raw diatomaceous earth has been used for many years as the basis for heat insulation fabrication, but the material manufactured from the raw diatomaceous earth presented several disadvantages which, up to the present time, have not been overcome. The raw diatomaceous earth contains impurities, such as clay and other colloids and organic matter which cause cracking of the finished product and a more dense product than would otherwise be obtained. I have found that these impurities may be removed by heating, roasting or calcining the raw material at a temperature sufficiently high to change the physical structure of the colloidal material and burn out the impurities. The roasting causes a shrinkage of the material, thus reducing the shrinkage which occurs when the finished product is dried or heated and renders the material more porous, so that its use results in a more efficient heat insulating material. The material may be roasted in either lump or granular form and is then ground, if necessary, to suitable fineness and is then used as described above in the same manner as raw diatomaceous earth.

I claim:

1. A heat insulating material comprising a mixture of diatomaceous earth, calcium carbonate, and basic magnesium carbonate.

2. The method of making a heat insulating material which comprises treating dolomite lime with carbon dioxide under temperature conditions which produce magnesium bicarbonate and a calcareous sludge, heating the mixture to convert the bicarbonate to basic magnesium carbonate, and adding diatomaceous earth to the mixture.

3. A heat insulating material including calcium carbonate and basic magnesium carbonate together making from twenty to forty per cent. of the whole, diatomaceous earth from fifty to seventy per cent. of the whole, and asbestos fiber from ten to fifteen per cent. of the whole.

4. A light weight, high temperature heat insulating material comprising a mixture of asbestos fibre, diatomaceous earth, calcium carbonate, and basic magnesium carbonate.

5. A light weight, high temperature heat insulating material comprising substantially calcium carbonate, and basic magnesium carbonate.

6. A heat insulating material including calcium carbonate and basic magnesium carbonate formed in the presence of each other by carbonating a solution containing soluble calcium and magnesium to form calcium carbonate and magnesium bicarbonate, the solution being heated to form basic magnesium carbonate in the presence of calcium carbonate.

7. A heat insulating material comprising diatomaceous earth, and calcium carbonate and basic magnesium carbonate formed by carbonating a solution whereby calcium carbonate and magnesium bicarbonate are formed, the solution being heated to form basic magnesium carbonate in the presence of calcium carbonate.

8. The steps in a process of forming a heat insulating material comprising forming calcium carbonate, forming magnesium bicarbonate, and heating the magnesium bicarbonate in the presence of the calcium carbonate to form basic magnesium carbonate.

9. The steps in a process of forming a heat insulating material comprising carbonating a solution containing soluble calcium and magnesium to form calcium carbonate and magnesium bicarbonate, and heating the magnesium bicarbonate in the presence of the calcium carbonate whereby basic magnesium carbonate is formed.

10. The process of forming a heat insulating material comprising forming from calcium and magnesium the carbonate and bicarbonate respectively, the calcium and magnesium being in substantially the proportions found in dolomite, adding diatomaceous earth, and heating the calcium carbonate, magnesium bicarbonate and diatomaceous earth together.

In testimony whereof, I have hereunto set my hand.

CARLTON EARLE MILLER.